Patented July 25, 1950

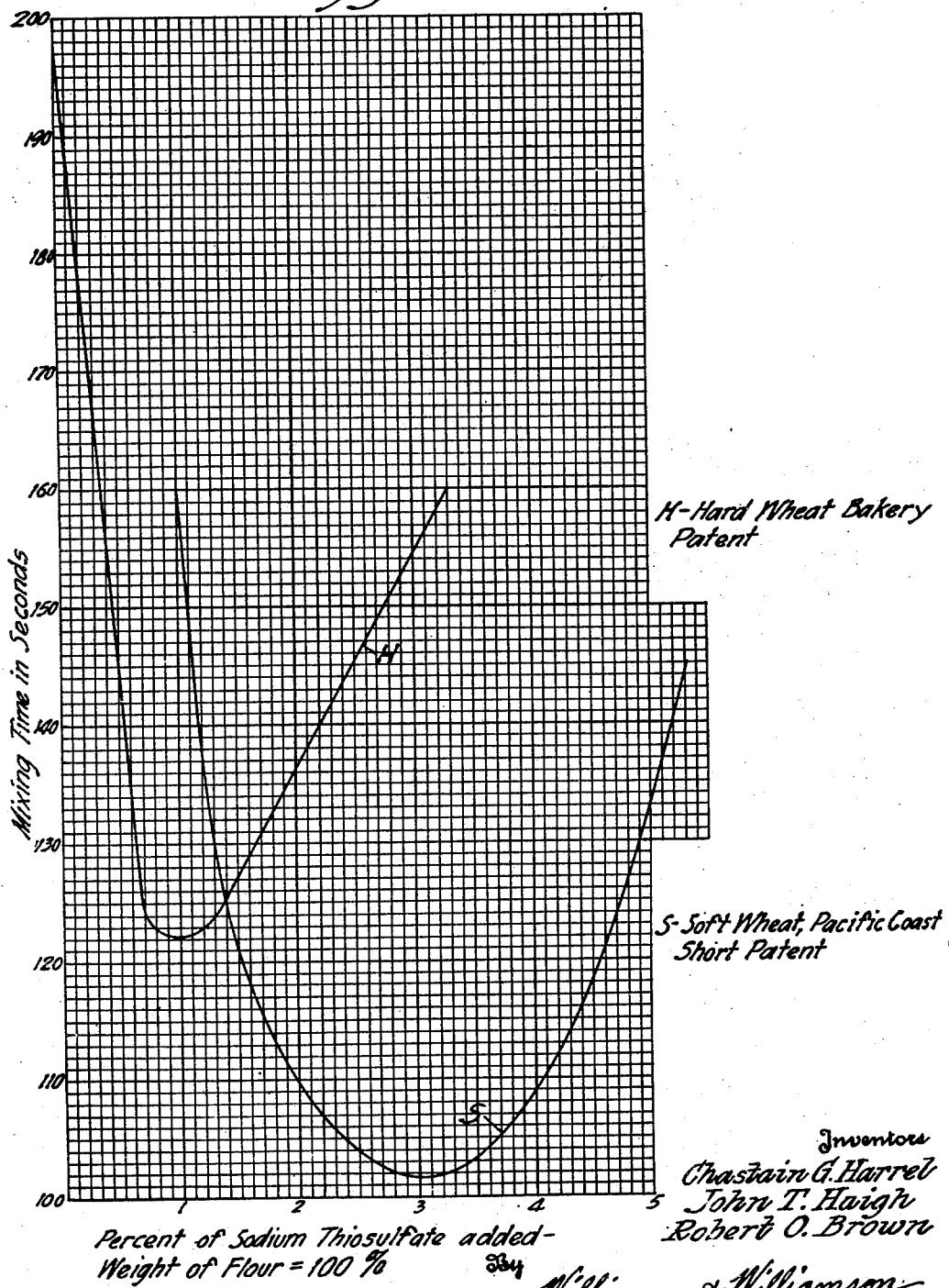

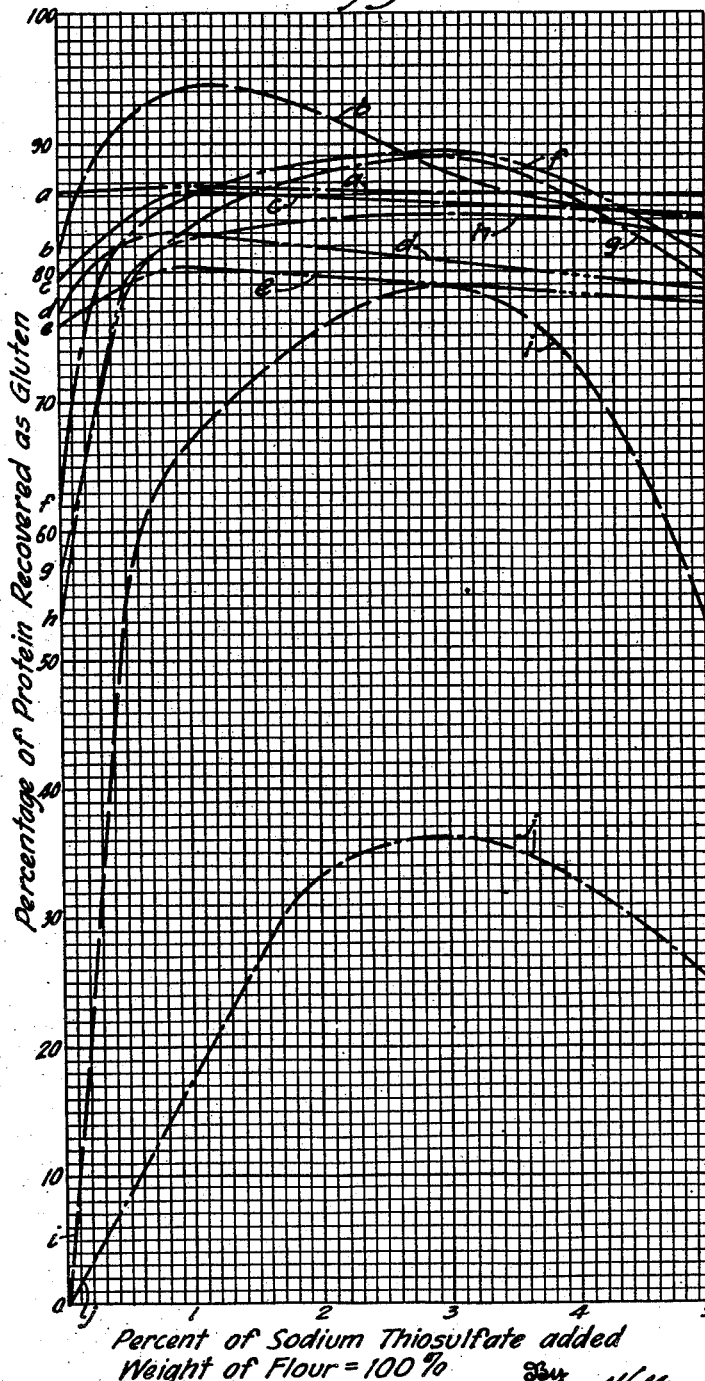

2,516,117

UNITED STATES PATENT OFFICE 2,516,117

SEPARATION OF THE STARCH AND GLUTEN CONSTITUENTS OF FLOUR

Chastain G. Harrel, John T. Haigh, and Robert O. Brown, Minneapolis, Minn., assignors to Pillsbury Mills, Inc., Minneapolis, Minn., a corporation of Delaware Application August 22, 1947, Serial No. 770,160

14 Claims. (Cl. 127—67)

This invention relates to the separation of starch and gluten from wheat flour.

In separating flour into its gluten and starch constituents, the common practice has been to first make a dough from the flour and thereafter wash the dough with water while agitating the same to carry off most of the starchy constituents in the wash water, leaving the gluten pretty well separated from the starchy constituents. Actually when a hard wheat non-phosphated flour is treated in this manner, a considerable proportion of the flour protein is carried off with the wash water to go with the starchy ingredients so that the separation is not as complete as is desirable. When a hard wheat phosphated flour is treated in this manner, the separation of the gluten from the starchy constituents is very incomplete and at best but a very limited gluten recovery is secured. When an attempt is made to separate the gluten from the soft wheat flours which are either non-phosphated or phosphated, the separation of the gluten from the starchy constituents fails for the reason that the gluten will not develop sufficiently but it will rather break up into hard lumps which do not cohere to form either a ball or curds and consequently the starch cannot be washed from soft wheat flour.

It is one of the objects of the present invention to provide a process for separating the starchy constituents of wheat flour from the protein constituents extracted as gluten of the wheat flour, which process will increase the yield of gluten when the process is employed with hard wheat flours which are non-phosphated, will readily permit the separation with a good yield of gluten from hard wheat flours which are phosphated, and which will permit the proper separation in the case of soft wheat flours either phosphated or non-phosphated.

Another object is to speed up the separation action.

Another object is to provide a suitable wetting agent for the gluten of wheat flour which will readily permit the separation of gluten from the starchy constituents of all kinds of wheat flour.

In accordance with the invention we add to the flour which is to be separated into its gluten and starchy constituents a small quantity of sodium thiosulfate, the amount of sodium thiosulfate used depending to a considerable extent on the character of the flour being treated. The thiosulfate is added to the flour in small quantity preparatory to other treatment. Either the dough process or the batter process can be employed for washing the starch from the gluten of the flour.

Dough process

In accordance with the dough process, the flour to which the sodium thiosulfate has been added is made into a dough by the addition of water, the amount of water employed being from 50% to 65% of the weight of the flour with sodium thiosulfate added. The flour, having been worked into a dough, is then submerged in water and washed in the water while the dough is being worked. The network of gluten fibers produced by the dough tends to hold the starch particles in the interstices, the starch being washed away as the dough is worked in the wash water. By forming the dough first, the gluten is retained in a mass together so that individual particles of gluten are not separated from the mass to be carried off in the wash water. Usually from two to three rinsings with fresh water are sufficient to complete the separation of the gluten constituents from the starchy constituents of the flour. There is left remaining a very high percentage of the proteins of the flour extracted as gluten. The wash water carrying the starchy constituents is treated in the usual manner to recover the starchy constituents; for example, the wash water may be centrifuged or the separation can be accomplished by settling or by other known methods.

Batter process

In accordance with the batter process, approximately 100 parts of flour to which sodium thiosulfate has been added is mixed with approximately 125 parts by weight water. This mixture is agitated as by manual agitation until it becomes a smooth cohesive batter. This batter is disintegrated into small curds by adding to it or adding it to an additional quantity of water equal to approximately three times the weight of the original flour with sodium thiosulfate added on a moisture free basis. The batter having been added to an additional quantity of water is violently agitated as by a mechanical agitator which will break up the batter into fine curds and wash the starch therefrom. After this has been accomplished, the curds of gluten are separated from the starch milk by flowing the fluid through a screen or other filter, the screen being of such size as to retain the gluten curds thereon for collection. The starch is then recovered from the wash water in accordance with standard practice as above described in connection with the dough process.

We have found that the addition of the sodium thiosulfate to dry flour prior to washing, employing either the dough process or the batter process, aids in the separation of the gluten from the starch during the washing process in several important ways. The treated flour is washed in much less time than is the case when sodium thiosulfate is not added. We have found that the separation can be accomplished in approximately 36% less mixing time than when untreated flour is washed. This is graphically illustrated in Fig. 1 of the drawings herewith submitted, wherein the vertical coordinates show mixing time in seconds and the horizontal coordinates show percentage of sodium thiosulfate added by weight, taking the weight of the flour as 100%. The graph designated H indicates mixing time required to secure proper separation between the gluten and the starch of hard wheat bakery patent flour with different percentages of sodium thiosulfate added when the batter process is employed. It will be noted that the separation is accomplished in the shortest mixing time, namely approximately 122 seconds, when 1% sodium thiosulfate is added to the hard wheat bakery patent flour. There is also shown in Fig. 1 a graph S showing the mixing time in seconds for soft wheat Pacific coast short patent flour with different percentages of sodium thiosulfate added. Inasmuch as it is impossible to separate the gluten from the starch of soft wheat flour by washing merely with water, it will be noted that the graph S starts at the point where 1% sodium thiosulfate is employed with the flour. It will also be noted that the shortest mixing time is secured, namely, mixing time will run between 101 and 102 seconds when approximately 3% sodium thiosulfate is added to the soft wheat Pacific coast short patent flour.

By adding sodium thiosulfate to hard wheat non-phosphated flours before separation by washing, the yield of flour protein extracted as gluten is considerably increased over what can be obtained when sodium thiosulfate is not employed. In the case of hard wheat phosphated flours, the percentage of flour protein extracted as gluten is very materially increased by the addition of sodium thiosulfate over what can be obtained when sodium thiosulfate is not added, the washing being accomplished with water in each case. It has been found impractical, if not almost impossible, to wash the starch from gluten of hard wheat phosphated flours by the dough process when sodium thiosulfate is not used and even when the batter process is employed in connection with hard wheat phosphated flours the yield of protein is quite low when sodium thiosulfate is not employed. In the case of either non-phosphated or phosphated soft wheat flours heretofore thought incapable of being separated into their gluten and starch constituents by washing, it was found that when sodium thiosulfate was added very good separation of the gluten from the starch would take place.

In Fig. 2 of the drawings graphs are illustrated wherein the vertical coordinates represent percentage of protein recovered as gluten and the horizontal coordinates represent the percentage of sodium thiosulfate added, taking the weight of the flour as 100%, the batter process of washing being employed. The graph $a$ indicates the results obtained with hard winter wheat bakery patent unbleached bromated flour. The graph $b$ indicates the results obtained with hard spring wheat bakery patent unbleached flour. The graph $c$ indicates results obtained with hard winter wheat bakery patent unbleached flour. The graph $d$ indicates results obtained with hard winter wheat bakery patent bleached bromated flour. The graph $e$ indicates results obtained with hard winter wheat bakery patent bleached flour. The graph $f$ indicates results obtained with hard winter wheat bakery patent unbleached phosphated flour. The graph $g$ indicates results obtained with hard spring wheat family patent phosphated flour. The graph $h$ indicates results obtained with hard winter wheat bakery patent bleached phosphated flour. The graph $i$ indicates results obtained with soft wheat Pacific coast short patent flour. The graph $j$ indicates results obtained with soft wheat Pacific coast short patent phosphated flour. While the results shown on the graph, Fig. 2, were all obtained using the batter process, it was found that quite comparable results will be obtained employing the dough process with the exception that in the case of phosphated hard wheat flours, when washing is done with the dough process, practically no protein recovered as gluten will be obtained without the addition of sodium thiosulfate.

It will be noted from a study of the graphs, Fig. 2 of the drawings, that optimum results in the recovery of portein as gluten are obtained in connection with nonphosphated hard wheat flours when approximately 1% sodium thiosulfate is added to 100% by weight of the flour. It will also be noted that in the case of the hard wheat phosphated flours and in the case of the soft wheat non-phosphated or phosphated flours optimum recovery of portein as gluten is secured when approximately 3% by weight sodium thiosulfate is added to 100% by weight of these flours. Good separation is obtained with hard wheat unphosphated flour, whether winter wheat or spring wheat, whether unbleached, unbromated, bleached, bromated, or both bleached and bromated but not phosphated, when from 0.25% to 1.5% sodium thiosulfate by weight is added to 100% of the flour. Also highly satisfactory separation is accomplished in the case of phosphated hard wheat flour, whether spring or winter wheat and whether unbleached or bleached, when from 2.5% to 3.5% by weight of the sodium thiosulfate is added to 100% by weight of the flour. Similarly it is found that quite satisfactory separation is secured in the case of soft wheat flour, whether non-phosphated or phosphated, when from 2.5% to 3.5% by weight of the sodium thiosulfate is added to 100% by weight of the flour. The preferred proportions of sodium thiosulfate for various types of non-phosphated winter wheat flour, therefore, are considered to be approximately 1.00% but may be within a range of from 0.25% to 1.5% while in the case of phosphated hard wheat flour and in the case of soft wheat flour, whether non-phosphated or phosphated, the preferred percentage of sodium thiosulfate is approximately 3% but may be within a range of from 2.5% to 3.5% sodium thiosulfate per 100% flour.

In carrying out our processes employing the sodium thiosulfate, it is found that the gluten washed from the treated flours exhibits more cohesiveness, softness, and elasticity than in the case of gluten washed from untreated flours. The gluten is more flexible and at the same time more tenacious than the ordinary gluten as washed from untreated flours. The sodium thiosulfate acts as a wetting agent for the gluten, permitting the starch to be more easily washed from the gluten fibers. The flour protein is less soluble in a sodium thiosulfate solution than in water only. After the separation is completed, it is found that the sodium thiosulfate is practically 100% present in the wash water, only a bare trace remaining in the recovered fractions of the starch and gluten.

The following examples are illustrative of manners of carrying out our processes.

Example I

One gram of sodium thiosulfate is added and mixed with 100 grams of non-sulphated hard winter wheat flour. Fifty-five grams of tap water are added to the flour-sodium thiosulfate mix, and the ingredients are worked into a smooth dough, whereupon the dough is shaped in the form of a ball and submerged in a first quantity of tempering tap water for a period of approximately 30 minutes. The dough ball is thereafter worked and kneaded under water until the starch is washed from the gluten fibers and the gluten is formed into a soft ball. As the starch is removed from the gluten, fresh water is continuously or intermittently added. If fresh water is continuously added, part of the starch milk produced in the wash water is drawn off as additional water is added. If fresh water is intermittently added, the starch milk produced in consecutive washes is decanted until the wash water is substantially free of starch. Wash water temperature may be varied within considerable limits, temperatures of from 25° to 33° C. being satisfactory but the maximum washing efficiency being obtained when the wash water is approximately 30° C. The gluten is collected and the starch recovered from the wash water.

The percentage of sodium thiosulfate added to the flour may be varied between the limits of 0.25% to 1.5% by weight of the flour. The quantity of water employed in making up the dough can be varied from 50% to 65% of the weight of the flour. Considerable variance in the quantities of wash water employed can be made.

Example II

Three grams of sodium thiosulfate are added to either phosphated hard wheat flour or non-phosphated or phosphated soft wheat flour, whereupon the same procedure is followed as in the case of Example I.

The percentage of sodium thiosulfate added to the flour may be varied between the limits of 2.5% to 3.5% by weight of the flour.

Example III

One gram of sodium thiosulfate is added to 100 grams non-phosphated hard wheat flour and mixed therewith, whereupon the wheat flour to which the sodium thiosulfate has been added is mixed with approximately 110 grams of water to form an adhesive batter. Thereupon approximately 300 grams of water are added to the batter and the batter is disintegrated by rapid stirring in the water to break the gluten up to form curds, separation taking place in from 120 to 130 seconds. The gluten curds are then separated from the starch water by pouring the mixture onto a sixty mesh screen and collected. The starch water passing through the screen is treated in a conventional manner for recovery of starch.

The percentage of sodium thiosulfate added to the flour may be varied between the limits of 0.25% to 1.5% by weight of the flour. Variance between the limits of 90 to 120 grams may be made in the quantity of water employed in forming the original batter. Considerable latitude within practical limits is permitted in the quantity of disintegration water employed.

Example IV

Three grams of sodium thiosulfate are added to 100 grams of either hard wheat phosphated flour or soft wheat non-phosphated or phosphated flour, whereupon the procedure specified in Example III is carried out.

The percentage of sodium thiosulfate added to the flour may be varied between the limits of 2.5% to 3.5% by weight of the flour.

From an examination of the graphs shown in Fig. 2, it will be seen that in carrying out our processes high percentages of protein recovered as gluten are separated from the various types of flours when employing the most advantageous proportions of sodium thiosulfate as indicated by the graphs.

It will be understood that various changes may be made in our processes and in the various steps thereof without departure from the scope of the present invention, which generally stated consists in the matter described and set forth in the appended claims.

We claim:

1. The process of separating gluten from wheat flour which consists in adding from one-fourth percent to three and one-half percent by weight sodium thiosulfate to the flour, mixing the flour to which the sodium thiosulfate has been added with a quantity of water sufficient to form a dough but not in excess of that required to form a batter, thereafter washing the preparation with a large quantity of water while agitating the same and removing the wash water containing the starch from the gluten.

2. The process of separating the gluten from hard wheat non-phosphated flour which consists in adding from 0.25% to 1.5% by weight of sodium thiosulfate to the flour, mixing the flour to which the sodium thiosulfate has been added with a quantity of water sufficient to form a dough but not in excess of that required to form a batter, thereafter washing the preparation with a larger quantity of water while agitating the same and removing the wash water containing the starch from the gluten.

3. The process of separating the gluten from a hard wheat non-phosphated flour which consists in adding approximately 1% by weight sodium thiosulfate to the flour, mixing the flour to which the sodium thiosulfate has been added with a quantity of water sufficient to form a dough but not in excess of that required to form a batter, thereafter washing the preparation with a larger quantity of water while agitating the same and removing the wash water containing the starch from the gluten.

4. The process of separating the gluten from a flour selected from a group of flours consisting of soft wheat non-phosphated flour, soft wheat phosphated flour, and hard wheat phosphated flour, which consists in adding from 2.5% to 3.5% of sodium thiosulfate to the flour selected, mixing the flour to which the sodium thiosulfate has been added with sufficient water to form a dough but not in excess of that required to form a batter, thereafter washing the preparation with a larger quantity of water while agitating the same and removing the wash water containing the starch from the gluten.

5. The process of separating gluten from a flour selected from a group of flours consisting of soft wheat non-phosphated flour, soft wheat phosphated flour, and hard wheat phosphated flour, which consists in adding approximately 3% by weight sodium thiosulfate to the flour selected, mixing the flour to which the sodium thiosulfate has been added with sufficient water to form a dough but not in excess of that required to form a batter, and thereafter washing the preparation with a larger quantity of water while agitating the same and removing the wash water containing the starch from the gluten.

6. The process of separating the gluten from a hard wheat non-phosphated flour which consists in adding from 0.25% to 1.5% by weight of sodium thiosulfate to the flour, forming the flour into a dough by the addition of water, washing the dough with a large volume of water while agitating the same and removing the gluten from the wash water containing the starch.

7. The process of separating the gluten from a hard wheat non-phosphated flour which consists in adding approximately 1% by weight of sodium thiosulfate to the flour, forming the flour into a dough by the addition of water thereto, washing the dough with a large volume of water while agitating the same and removing the gluten from the wash water containing the starch.

8. The process of separating the gluten from a flour selected from a group of flours consisting of soft wheat non-phosphated flour, soft wheat phosphated flour, and hard wheat phosphated flour, which consists in adding from 2.5% to 3.5% by weight of sodium thiosulfate to the flour selected, forming the flour into a dough by the addition of water, washing the dough with a large volume of water while agitating the same and removing the gluten from the wash water containing the starch.

The process of separating the gluten from a flour selected from a group of flours consisting of soft wheat non-phosphated flour, soft wheat phosphated flour, and hard wheat phosphated flour which consists in adding approximately 3% by weight of sodium thiosulfate to the flour selected, forming the flour to which the sodium thiosulfate has been added into a dough by the addition of water, washing the dough with a large volume of water while agitating the same and removing the gluten from the wash water containing the starch.

10. The process of separating the gluten from a hard wheat non-phosphated flour which consists in adding from 0.25% to 1.5% sodium thiosulfate to the flour, mixing the flour to which the sodium thiosulfate has been added into a batter by the addition of water, and thereafter mixing a larger volume of water with the batter while agitating the same and collecting the gluten curds which form while separating the water containing the starch from the gluten curds.

11. The process of separating the gluten from a hard wheat non-phosphated flour which consists in adding approximately 1% by weight of sodium thiosulfate to the flour, adding water to the flour-sodium thiosulfate mix to produce a batter, mixing and agitating the batter in a large volume of water, and collecting the gluten curds which form while separating the water containing the starch from the gluten curds.

12. The process of separating gluten from a flour selected from a group of flours consisting of soft wheat non-phosphated flour, soft wheat phosphated flour, and hard wheat phosphated flour, which consists in adding from 2.5% to 3.5% sodium thiosulfate to the selected flour, mixing water with the flour-sodium thiosulfate mix to form a batter, mixing and agitating the batter with a large volume of water, and collecting the gluten curds resulting while separating the water containing the starch from the gluten curds.

13. The process of separating gluten from a flour selected from a group of flours consisting of soft wheat non-phosphated flour, soft wheat phosphated flour, and hard wheat phosphated flour, which consists in adding approximately 3% sodium thiosulfates to the selected flour, mixing water with the flour-sodium thiosulfate mix to form a batter, mixing and agitating the batter with a large valume of water, and collecting the gluten curds resulting while separating the water containing the starch from the gluten curds.

14. The process of separating gluten from wheat flour which consists in adding from .25% to 3.5% sodium thiosulfate to the flour, mixing the flour to which the sodium thiosulfate has been added with a small quantity of water to produce a semi-liquid preparation, thereafter washing the preparation with a large quantity of water while agitating the same and removing the wash water containing the starch from the gluten.

CHASTAIN G. HARREL.
JOHN T. HAIGH.
ROBERT O. BROWN.

REFERENCES CITED

The following references are of record in the file of this patent:

UNITED STATES PATENTS

| Number | Name | Date |
|---|---|---|
| 1,156,801 | Moore | Oct. 12, 1915 |
| 2,368,668 | Langlord et al. | Feb. 6, 1945 |
| 2,418,621 | Callaghan | Apr. 8, 1947 |
| 2,418,669 | Schilling | Apr. 8, 1947 |